United States Patent
Yu et al.

(10) Patent No.: US 10,523,529 B2
(45) Date of Patent: Dec. 31, 2019

(54) METHOD AND APPARATUS FOR DEPLOYING NETWORK SERVICE

(71) Applicant: Huawei Technologies Co., Ltd., Shenzhen (CN)

(72) Inventors: Fang Yu, Beijing (CN); Haitao Xia, Beijing (CN); Zhixian Xiang, Cupertino, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 15/906,943

(22) Filed: Feb. 27, 2018

(65) Prior Publication Data
US 2018/0191581 A1    Jul. 5, 2018

Related U.S. Application Data

(63) Continuation of application No. PCT/CN2015/088605, filed on Aug. 31, 2015.

(51) Int. Cl.
*H04L 12/24*    (2006.01)
*G06F 9/455*    (2018.01)
*H04L 29/06*    (2006.01)

(52) U.S. Cl.
CPC ...... *H04L 41/5041* (2013.01); *G06F 9/45558* (2013.01); *H04L 41/042* (2013.01);
(Continued)

(58) Field of Classification Search
None
See application file for complete search history.

(56) References Cited

U.S. PATENT DOCUMENTS 9,384,028 B1 *   7/2016   Felstaine ................. H04L 67/02
9,430,262 B1 *   8/2016   Felstaine ............. G06F 9/45558
(Continued)

FOREIGN PATENT DOCUMENTS

CN    104050045 A    9/2014
EP    2518941 A1    10/2012
(Continued)

OTHER PUBLICATIONS

Csoma, A. et al., "Multi-layered service orchestration in a multi-domain network environment," 2014 Third European Workshop on Software-Defined Networks, 2014, 2 pages.
(Continued)

*Primary Examiner* — Warner Wong
(74) *Attorney, Agent, or Firm* — Slater Matsil, LLP

(57) ABSTRACT

A method and an apparatus for cross-domain deployment of a network service, the method including obtaining, by a primary orchestrator, a network service instantiation request, where the network service instantiation request requests that the primary orchestrator instantiate the network service, obtaining network service description information across orchestrator management domains, determining, according to the network service description information, a first virtualized network function that needs to be deployed in a management domain of a secondary orchestrator, and sending a virtualized network function instantiation request to the secondary orchestrator, where the virtualized network function instantiation request requests that the secondary orchestrator to instantiate the first virtualized network function, where a management domain of the primary orchestrator is different from the management domain of the secondary orchestrator.

20 Claims, 9 Drawing Sheets

(52) U.S. Cl.
CPC ...... *H04L 41/0803* (2013.01); *H04L 41/0806* (2013.01); *H04L 63/12* (2013.01)

(56) References Cited

U.S. PATENT DOCUMENTS

| | | | | |
|---|---|---|---|---|
| 9,749,294 | B1* | 8/2017 | Marquardt | H04L 63/0272 |
| 9,774,541 | B1* | 9/2017 | Herzog | H04L 47/78 |
| 9,948,493 | B2* | 4/2018 | Fargano | H04L 43/08 |
| 10,064,167 | B1* | 8/2018 | Felstaine | H04W 72/0413 |
| 10,116,514 | B1* | 10/2018 | Felstaine | H04L 41/0695 |
| 2007/0282990 | A1* | 12/2007 | Kumar | H04L 65/1016 |
| | | | | 709/223 |
| 2012/0278430 | A1 | 11/2012 | Lehane et al. | |
| 2014/0317261 | A1 | 10/2014 | Shatzkamer et al. | |
| 2015/0142940 | A1 | 5/2015 | McMurry et al. | |
| 2015/0215228 | A1 | 7/2015 | McMurry | |
| 2015/0288541 | A1* | 10/2015 | Fargano | H04L 43/08 |
| | | | | 709/225 |
| 2015/0288767 | A1* | 10/2015 | Fargano | H04L 43/08 |
| | | | | 709/227 |
| 2016/0139939 | A1* | 5/2016 | Bosch | H04L 67/10 |
| | | | | 718/1 |
| 2016/0205005 | A1* | 7/2016 | Lee | H04L 41/5025 |
| | | | | 709/224 |
| 2016/0301668 | A1* | 10/2016 | Marquardt | H04L 63/06 |
| 2016/0335111 | A1* | 11/2016 | Bruun | G06F 9/45558 |
| 2017/0078114 | A1* | 3/2017 | Mibu | H04L 12/4633 |
| 2017/0111447 | A1* | 4/2017 | Xie | H04L 67/1031 |
| 2017/0220371 | A1* | 8/2017 | Kosugi | H04W 24/02 |
| 2018/0054855 | A1* | 2/2018 | Nakano | H04W 8/18 |
| 2018/0262431 | A1* | 9/2018 | Zhang | H04L 41/0806 |

FOREIGN PATENT DOCUMENTS

| | | |
|---|---|---|
| EP | 3094049 A1 | 11/2016 |
| WO | 2015077377 A1 | 5/2015 |
| WO | 2015113234 A1 | 8/2015 |
| WO | 2015113278 A1 | 8/2015 |
| WO | 2015116449 A1 | 8/2015 |

OTHER PUBLICATIONS

"Network Functions Virtualisation (NFV); Management and Orchestration," Group Specification, ETSI GS NFV-MAN 001, V1.1.1, Dec. 2014, 184 pages.

* cited by examiner

METHOD AND APPARATUS FOR DEPLOYING NETWORK SERVICE

CROSS-REFERENCE TO RELATED APPLICATIONS

This application is a continuation of International Patent Application No. PCT/CN2015/088605 filed on Aug. 31, 2015. The disclosure of the aforementioned application is hereby incorporated by reference in the entity.

TECHNICAL FIELD

The present disclosure relates to the field of network communications technologies, and in particular, to a method and an apparatus for deploying a network service.

BACKGROUND

A network function virtualization (NFV) technology is initiated by 13 major telecommunications operators in the world, and participated in by many equipment vendors and information technology (IT) manufacturers. By using the NFV technology, software and hardware separation may be implemented for various network devices such as a server, a router, a storage device, and a switch. By using the NFV technology, the foregoing devices may be deployed in a data center, a network node, or a user home.

In short, the NFV technology mainly integrates hardware resources of various computers that have a data processing capability and that are on a network, so that these computers can implement a function of a device (for example, a server, a router, a storage device, or a switch) in a communications network. In the NFV technology, a function borne by a physical device after the physical device is virtualized may be referred to as a virtualized network function (VNF). One or more VNFs may be combined into a network service (NS) in a particular manner.

In an actual NFV system, a device that manages the virtualized network function may be referred to as a network function virtualization orchestrator (NFVO).

It is found that in the existing NFV technology, one NFVO can deploy an NS only in a management domain of the NFVO. When an NFVO needs to deploy the NS in a management domain of another NFVO, no corresponding method may be used.

SUMMARY

In view of this, the present disclosure provides a method and an apparatus for deploying a network service, and resolves, by means of information exchange between orchestrators, a problem of deploying an NS in different domains. Specific solutions thereof are as follows.

According to a first possible implementation of a first aspect of this application, this application provides a method for deploying a network service, including obtaining, by a primary orchestrator, a network service instantiation request, where the network service instantiation request is used to request the primary orchestrator to instantiate the network service, obtaining, by the primary orchestrator, network service description information across orchestrator management domains, determining, by the primary orchestrator according to the network service description information, a first virtualized network function that needs to be deployed in a management domain of a secondary orchestrator, and sending, by the primary orchestrator, a virtualized network function instantiation request to the secondary orchestrator, where the virtualized network function instantiation request is used to request the secondary orchestrator to instantiate the first virtualized network function, where a management domain of the primary orchestrator is different from the management domain of the secondary orchestrator.

With reference to a second possible implementation of the first aspect, where after the obtaining, by the primary orchestrator, network service description information across orchestrator management domains, the method further includes determining, by the primary orchestrator according to the network service description information, a second virtualized network function that needs to be deployed in the management domain of the primary orchestrator, and instantiating, by the primary orchestrator, the second virtualized network function.

With reference to a third possible implementation of the first aspect, after the sending, by the primary orchestrator, a virtualized network function instantiation request to the secondary orchestrator, the method further includes receiving, by the primary orchestrator, a lifecycle management operation request sent by the secondary orchestrator, where the lifecycle management operation request is used to request to manage a lifecycle of the instantiated first virtualized network function, and sending, by the primary orchestrator, a lifecycle management operation request acknowledgment message to the secondary orchestrator.

With reference to a fourth possible implementation of the first aspect, after the sending a virtualized network function instantiation request to the secondary orchestrator, the method further includes sending, by the primary orchestrator, lifecycle management policy information to the secondary orchestrator, where the lifecycle management policy information is used to describe permission of the secondary orchestrator to perform a lifecycle management operation on the first virtualized network function.

With reference to a fifth possible implementation of the first aspect, the network service description information specifically includes: a network service descriptor and/or a network service instantiation parameter.

According to a first possible implementation of a second aspect of this application, this application provides another method for deploying a network service, including obtaining, by a primary orchestrator, a network service instantiation request, where the network service instantiation request is used to request the primary orchestrator to instantiate the network service, and the network service includes a first subnetwork service nested in the network service, obtaining, by the primary orchestrator, network service description information across orchestrator management domains, determining, by the primary orchestrator according to the network service description information, the first subnetwork service that needs to be deployed in a management domain of a secondary orchestrator, and sending, by the primary orchestrator, a subnetwork service instantiation request to the secondary orchestrator, where the subnetwork service instantiation request is used to request the secondary orchestrator to instantiate the first subnetwork service, where a management domain of the primary orchestrator is different from the management domain of the secondary orchestrator.

With reference to a second possible implementation of the second aspect, where the network service further includes a virtualized network function, and after the obtaining, by the primary orchestrator, network service description information across orchestrator management domains, the method further includes determining, by the primary orchestrator according to the network service description information, a virtualized network function that needs to be deployed in the management domain of the primary orchestrator, and instantiating, by the primary orchestrator, the virtualized network function.

With reference to a third possible implementation of the second aspect, where the network service further includes a second subnetwork service, and after the obtaining, by the primary orchestrator, network service description information across orchestrator management domains, the method further includes determining, by the primary orchestrator according to the network service description information, the second subnetwork service that needs to be deployed in the management domain of the primary orchestrator, and instantiating, by the primary orchestrator, the second subnetwork service.

With reference to a fourth possible implementation of the second aspect, after the sending a subnetwork service instantiation request to the secondary orchestrator, the method further includes receiving, by the primary orchestrator, a network service management request sent by the secondary orchestrator, where the network service management request is used to request to manage the instantiated first subnetwork service, and sending, by the primary orchestrator, a network service management request acknowledgment message to the secondary orchestrator.

With reference to a fifth possible implementation of the second aspect, after the sending a subnetwork service instantiation request to the secondary orchestrator, the method further includes sending, by the primary orchestrator, lifecycle management policy information to the secondary orchestrator, where the lifecycle management policy information is used to describe permission of the secondary orchestrator to perform a lifecycle management operation on the first subnetwork service.

With reference to a sixth possible implementation of the second aspect, the network service description information specifically includes: a network service descriptor and/or a network service instantiation parameter.

According to a first possible implementation of a third aspect of this application, this application provides a method for deploying a network service, including obtaining, by a secondary orchestrator, a virtualized network function instantiation request sent by a primary orchestrator, where the virtualized network function instantiation request is used to request the secondary orchestrator to instantiate a virtualized network function that is in the network service and that needs to be deployed in a management domain of the secondary orchestrator, and instantiating, by the secondary orchestrator, the virtualized network function that needs to be deployed in the management domain of the secondary orchestrator, where the management domain of the secondary orchestrator is different from a management domain of the primary orchestrator.

With reference to a second possible implementation of the third aspect, where after the instantiating the virtualized network function that needs to be deployed in the management domain of the secondary orchestrator, the method further includes sending, by the secondary orchestrator, a lifecycle management operation request to the primary orchestrator, where the lifecycle management operation request is used to request to manage a lifecycle of one or more virtualized network functions in the instantiated virtualized network function that needs to be deployed in the management domain of the secondary orchestrator, obtaining, by the secondary orchestrator, a lifecycle management operation request acknowledgment message fed back by the primary orchestrator, and performing, by the secondary orchestrator, a lifecycle management operation on one or more virtualized network functions in the instantiated virtualized network function that needs to be deployed in the management domain of the secondary orchestrator.

With reference to a third possible implementation of the third aspect, after the obtaining a virtualized network function instantiation request sent by a primary orchestrator, the method further includes obtaining, by the secondary orchestrator, lifecycle management policy information sent by the primary orchestrator, where the lifecycle management policy information is used to describe permission of the secondary orchestrator to perform a lifecycle management operation on the virtualized network function that needs to be deployed in the management domain of the secondary orchestrator.

According to a first possible implementation of a fourth aspect of this application, this application provides a method for deploying a network service, including obtaining, by a secondary orchestrator, a subnetwork service instantiation request sent by a primary orchestrator, where the subnetwork service instantiation request is used to request the secondary orchestrator to instantiate a subnetwork service in the network service, and instantiating, by the secondary orchestrator, the subnetwork service, where a management domain of the secondary orchestrator is different from a management domain of the primary orchestrator.

With reference to a second possible implementation of the fourth aspect, after the instantiating the subnetwork service, the method further includes sending, by the secondary orchestrator, a network service management request to the primary orchestrator, where the network service management request is used to request to perform lifecycle management on the instantiated subnetwork service, obtaining, by the secondary orchestrator, a network service management request acknowledgment message fed back by the primary orchestrator, and performing, by the secondary orchestrator, lifecycle management on the instantiated subnetwork service.

With reference to a third possible implementation of the fourth aspect, after the obtaining, by a secondary orchestrator, a subnetwork service instantiation request sent by a primary orchestrator, the method further includes obtaining, by the secondary orchestrator, lifecycle management policy information sent by the primary orchestrator, where the lifecycle management policy information is used to describe permission of the secondary orchestrator to perform a lifecycle management operation on the subnetwork service.

According to a first possible implementation of a fifth aspect of this application, this application provides an apparatus for deploying a network service, including an obtaining unit, configured to obtain a network service instantiation request, where the network service instantiation request is used to request the apparatus for deploying a network service to instantiate the network service, and the obtaining unit is further configured to obtain network service description information across orchestrator management domains, a processing unit, configured to determine, according to the network service description information, a first virtualized network function that needs to be deployed in a management domain of a secondary orchestrator, and a sending unit, configured to send a virtualized network function instantiation request to the secondary orchestrator, where the virtualized network function instantiation request is used to request the secondary orchestrator to instantiate the first virtualized network function, where a management domain of the apparatus for deploying a network service is different from the management domain of the secondary orchestrator.

With reference to a second possible implementation of the fifth aspect, the processing unit is further configured to after the network service description information across orchestrator management domains is obtained, determine, according to the network service description information, a second virtualized network function that needs to be deployed in the management domain of the apparatus for deploying a network service, and instantiate the first virtualized network function.

With reference to a third possible implementation of the fifth aspect, the obtaining unit is further configured to after the virtualized network function instantiation request is sent to the secondary orchestrator, receive a lifecycle management operation request sent by the secondary orchestrator, where the lifecycle management operation request is used to request to manage a lifecycle of the instantiated first virtualized network function, and the sending unit is further configured to send a lifecycle management operation request acknowledgment message to the secondary orchestrator.

With reference to a fourth possible implementation of the fifth aspect, the sending unit is further configured to after sending the virtualized network function instantiation request to the secondary orchestrator, send lifecycle management policy information to the secondary orchestrator, where the lifecycle management policy information is used to describe permission of the secondary orchestrator to perform a lifecycle management operation on the first virtualized network function.

With reference to a fifth possible implementation of the fifth aspect, the network service description information specifically includes: a network service descriptor and/or a network service instantiation parameter.

According to a first possible implementation of a sixth aspect of this application, this application provides an apparatus for deploying a network service, including an obtaining unit, configured to obtain a network service instantiation request, where the network service instantiation request is used to request the apparatus for deploying a network service to instantiate the network service, and the network service includes a first subnetwork service nested in the network service, and obtain network service description information across orchestrator management domains, a processing unit, configured to determine, according to the network service description information, the first subnetwork service that needs to be deployed in a management domain of a secondary orchestrator, and a sending unit, configured to send a subnetwork service instantiation request to the secondary orchestrator, where the subnetwork service instantiation request is used to request the secondary orchestrator to instantiate the first subnetwork service, where a management domain of the apparatus for deploying a network service is different from the management domain of the secondary orchestrator.

With reference to a second possible implementation of the sixth aspect, the network service further includes a virtualized network function, and the processing unit is further configured to after the network service description information across orchestrator management domains is obtained, determine, according to the network service description information, a virtualized network function that needs to be deployed in the management domain of the apparatus for deploying a network service, and instantiate the virtualized network function.

With reference to a third possible implementation of the sixth aspect, the network service further includes a second subnetwork service, and the processing unit is further configured to after the network service description information across orchestrator management domains is obtained, determine, according to the network service description information, the second subnetwork service that needs to be deployed in the management domain of the apparatus for deploying a network service, and instantiate the second subnetwork service.

With reference to a fourth possible implementation of the sixth aspect, the obtaining unit is further configured to after the subnetwork service instantiation request is sent to the secondary orchestrator, receive a network service management request sent by the secondary orchestrator, where the network service management request is used to manage the instantiated first subnetwork service, and the sending unit is further configured to send a network service management request acknowledgment message to the secondary orchestrator.

With reference to a fifth possible implementation of the sixth aspect, the sending unit is further configured to after sending the subnetwork service instantiation request to the secondary orchestrator, send lifecycle management policy information to the secondary orchestrator, where the lifecycle management policy information is used to describe permission of the secondary orchestrator to perform a lifecycle management operation on the first subnetwork service.

With reference to a sixth possible implementation of the sixth aspect, the network service description information specifically includes: a network service descriptor and/or a network service instantiation parameter.

According to a first possible implementation of a seventh aspect of this application, this application provides an apparatus for deploying a network service, including an obtaining unit, configured to obtain a virtualized network function instantiation request sent by a primary orchestrator, where the virtualized network function instantiation request is used to request the apparatus for deploying a network service to instantiate a virtualized network function that is in the network service and that needs to be deployed in a management domain of the apparatus for deploying a network service, and a processing unit, configured to instantiate the virtualized network function that needs to be deployed in the management domain of the apparatus for deploying a network service, where the management domain of the apparatus for deploying a network service is different from a management domain of the primary orchestrator.

With reference to a second possible implementation of the seventh aspect, the apparatus further includes a sending unit, configured to: after the virtualized network function that needs to be deployed in the management domain of the apparatus for deploying a network service is instantiated, send a lifecycle management operation request to the primary orchestrator, where the lifecycle management operation request is used to request to manage a lifecycle of one or more virtualized network functions in the instantiated virtualized network function that needs to be deployed in the management domain of the apparatus for deploying a network service, where the obtaining unit is further configured to obtain a lifecycle management operation request acknowledgment message fed back by the primary orchestrator, and the processing unit is further configured to perform a lifecycle management operation on one or more virtualized network functions in the instantiated virtualized network function that needs to be deployed in the management domain of the apparatus for deploying a network service.

With reference to a third possible implementation of the seventh aspect, the obtaining unit is further configured to after obtaining the virtualized network function instantiation request sent by the primary orchestrator, obtain lifecycle management policy information sent by the primary orchestrator, where the lifecycle management policy information is used to describe permission of the apparatus for deploying a network service to perform a lifecycle management operation on the virtualized network function that needs to be deployed in the management domain of the apparatus for deploying a network service.

According to a first possible implementation of an eighth aspect of this application, this application provides an apparatus for deploying a network service, including an obtaining unit, configured to obtain a subnetwork service instantiation request sent by a primary orchestrator, where the subnetwork service instantiation request is used to request the apparatus for deploying a network service to instantiate a subnetwork service in the network service, and a processing unit, configured to instantiate the subnetwork service, where a management domain of the apparatus for deploying a network service is different from a management domain of the primary orchestrator.

With reference to a second possible implementation of the eighth aspect, the apparatus further includes a sending unit, configured to: after the subnetwork service is instantiated, send a network service management request to the primary orchestrator, where the network service management request is used to request to perform lifecycle management on the instantiated subnetwork service, where the obtaining unit is further configured to obtain a network service management request acknowledgment message fed back by the primary orchestrator, and the processing unit is further configured to perform lifecycle management on the instantiated subnetwork service.

With reference to a third possible implementation of the eighth aspect, the obtaining unit is further configured to after obtaining the subnetwork service instantiation request sent by the primary orchestrator, obtain lifecycle management policy information sent by the primary orchestrator, where the lifecycle management policy information is used to describe permission of the apparatus for deploying a network service to perform a lifecycle management operation on the subnetwork service.

It can be seen from the foregoing technical solutions that, according to the method and apparatus for deploying a network service in this application, network service description information is obtained; the other virtualized network functions that need to be deployed in the management domain of the secondary orchestrator are determined according to the network service description information; and a VNF service instantiation request is sent to the secondary orchestrator. Therefore, cross-domain deployment of an NS can be implemented by means of information exchange between the primary orchestrator and the secondary orchestrator.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
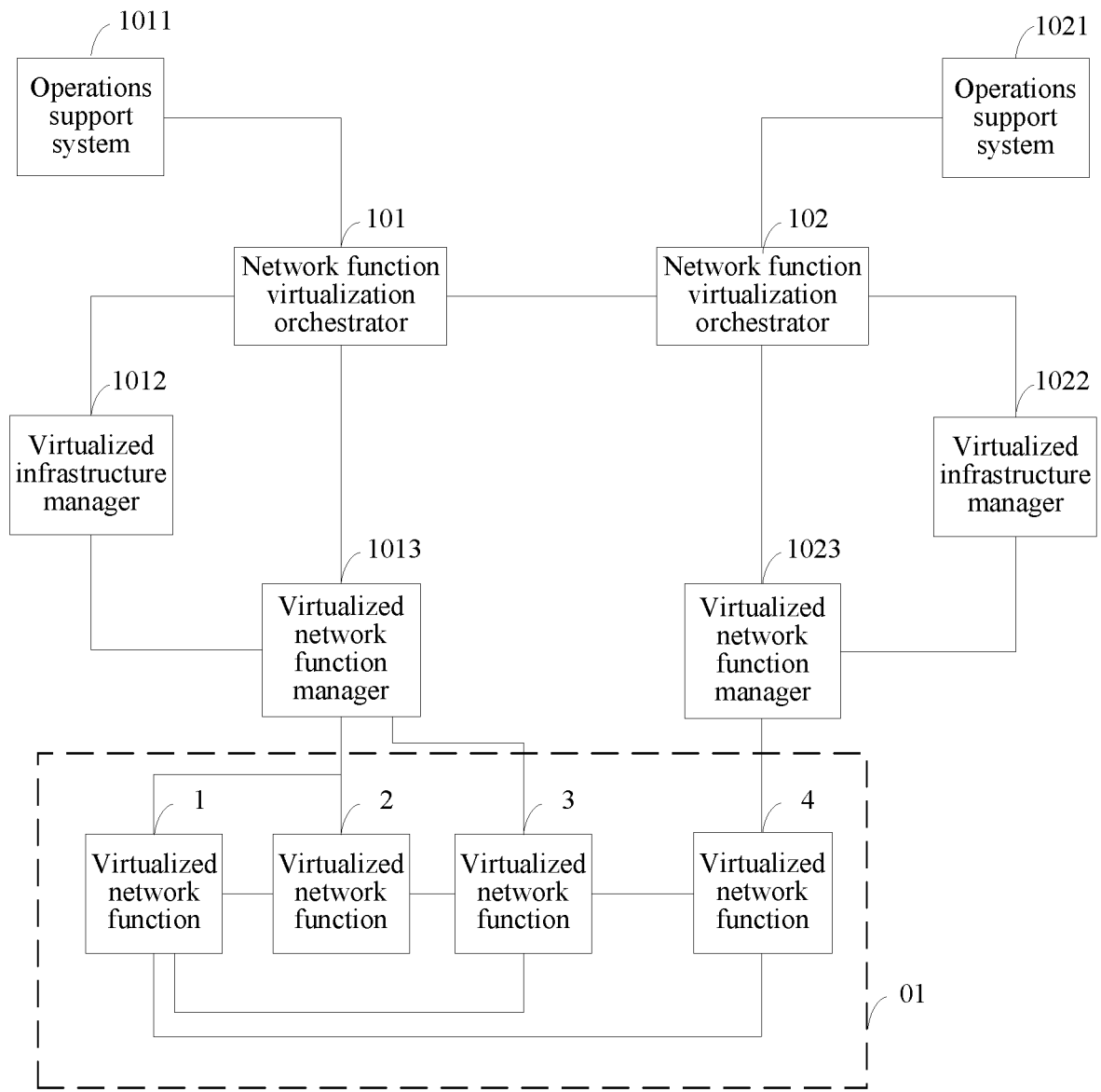
FIG. 1 is a schematic architectural diagram of an NFV system according to some embodiments.

FIG. 1 is a schematic architectural diagram of an NFV system according to this application. The system shown in FIG. 1 includes two subsystems. One subsystem includes: a network function virtualization orchestrator (NFVO) 101, an operations support system (OSS) 1011, a virtualized infrastructure manager (VIM) 1012, and a virtualized network function manager (VNFM) 1013. The NFVO 101 is responsible for managing a domain. The other subsystem includes a network function virtualization orchestrator 102, an operations support system 1021, a virtualized infrastructure manager 1022, and a virtualized network function manager 1023. The network function virtualization orchestrator 102 is responsible for managing another description.

A network service 01 includes a virtualized network function 1, a virtualized network function 2, a virtualized network function 3, and a virtualized network function 4. The virtualized network function 1, the virtualized network function 2, and the virtualized network function 3 are deployed in the management domain of the network function virtualization orchestrator 101, and the virtualized network function 4 is deployed in the management domain of the network function virtualization orchestrator 102.

To complete deployment of the network service 01 and a similar network service, a method for deploying a network service in this embodiment of this application may be used.

Figure 2:
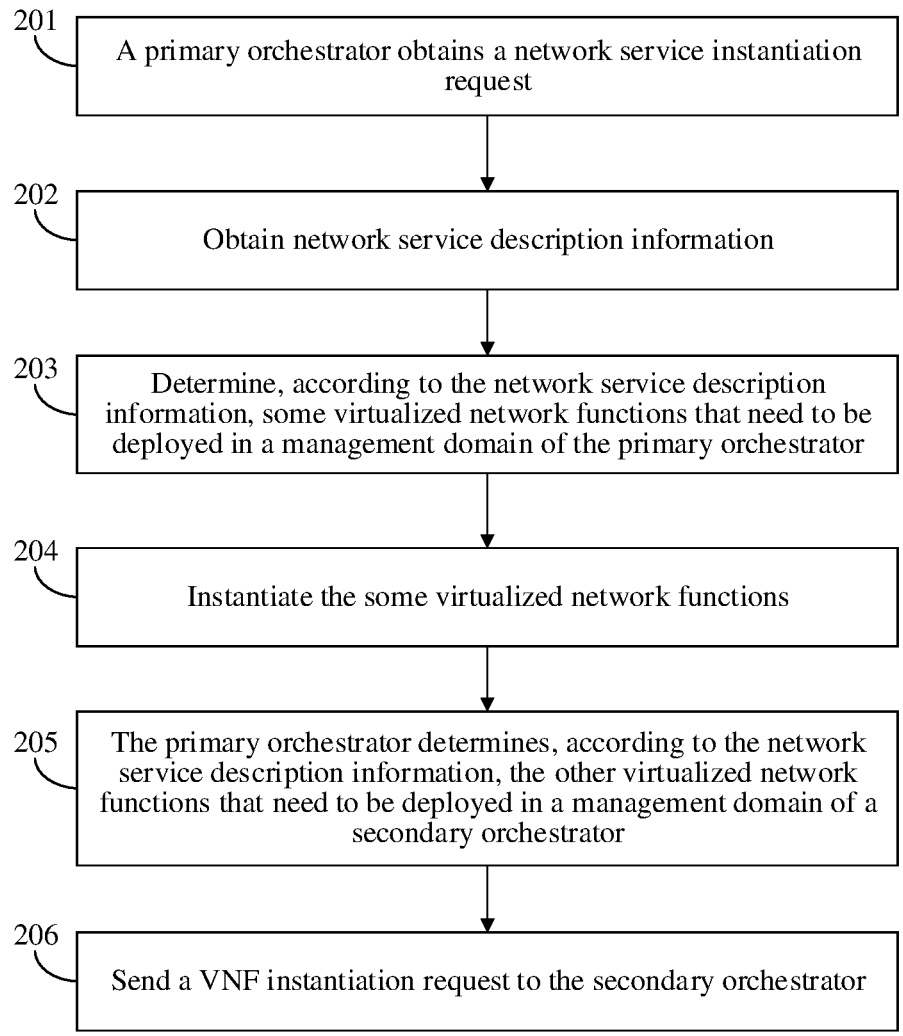
FIG. 2 is a flowchart of Embodiment 1 of a method for deploying a network service according to some embodiments.

FIG. 2 is a flowchart of Embodiment 1 of a method for deploying a network service according to this application. As shown in FIG. 2, the method may include the following steps.

Step 201: A primary orchestrator obtains a network service instantiation request where the network service instantiation request is used to request the primary orchestrator to instantiate the network service.

The network service instantiation request may carry a network instantiation parameter.

Optionally, the network service instantiation request may be sent by another device to the primary orchestrator, or may be entered by a user into the primary orchestrator. Optionally, a device that sends a network service instantiation request to the primary orchestrator may be an OSS or a business support system (BSS).

It should be noted that, the instantiation in the embodiments of this application mainly includes VNF instantiation or NS instantiation.

The VNF instantiation means that VNF software is deployed on a corresponding network function virtualization infrastructure (NFVI). In the VNF instantiation, a process of allocating corresponding calculation, storage, and network resources to a VNF needs to be completed.

The NS instantiation means that a VNF and a virtual link (VL) that are included in an NS are separately instantiated. The VL refers to a virtual link between VNFs. VL instantiation means that the virtual link between the VNFs is established by allocating a corresponding network resource, so that network connection and interaction can be performed between the VNFs.

In this embodiment of this application, the primary orchestrator may be specifically a network function virtualization orchestrator (NFVO), a network service orchestrator (NSO), or a resource orchestrator (RO).

Specifically, the secondary orchestrator in this embodiment of this application may be also an NFVO, an NSO, or an RO.

In actual application, the primary orchestrator and the secondary orchestrator may form at least the following combinations:

the primary orchestrator is specifically a network function virtualization orchestrator, and the secondary orchestrator is specifically a network function virtualization orchestrator; or the primary orchestrator is specifically a resource orchestrator, and the secondary orchestrator is specifically a resource orchestrator; or the primary orchestrator is specifically a network service orchestrator, and the secondary orchestrator is specifically a network service orchestrator; or the primary orchestrator is specifically a network function virtualization orchestrator, and the secondary orchestrator is specifically a network service orchestrator; or the primary orchestrator is specifically a network service orchestrator, and the secondary orchestrator is specifically a network function virtualization orchestrator; or the primary orchestrator is specifically a network service orchestrator, and the secondary orchestrator is specifically a resource orchestrator; or the primary orchestrator is specifically a network function virtualization orchestrator, and the secondary orchestrator is specifically a resource orchestrator.

Optionally, before the primary orchestrator obtains the network service instantiation request, roles may be not assigned for the primary orchestrator and the secondary orchestrator in this embodiment. That is, the network service instantiation request or the network service instantiation parameter may include role information, and the role information is used to indicate that a first orchestrator is the primary orchestrator of the network service, and a second orchestrator is the secondary orchestrator of the network service. The first orchestrator determines, only after receiving the network service instantiation request, that the first orchestrator is the primary orchestrator relative to the network service and the second orchestrator is the secondary orchestrator relative to the network service.

Optionally, for different network services, orchestrators may have different roles. Optionally, the role information of the orchestrators may be further included in a network service descriptor (NSD). That is, it is pointed out in the NSD that an NS corresponding to the NSD is deployed in domains managed by which two orchestrators, and a role corresponding to each orchestrator. The network service instantiation request may be sent by another device to the primary orchestrator, or may be triggered by the primary orchestrator according to an operation entered by an operator.

Before the network service instantiation request is obtained, uploading of the NSD and a virtualized network function program package (VNF package) may be completed first. After the uploading is completed, the primary orchestrator stores information about the NSD and the VNF package.

The NSD is used to describe the network service, and may be used by the NFVO, the NSO, or the RO to instantiate the NS. The NS includes one or more virtualized network functions (VNF) and a virtual link (VL). The NSD may reference a corresponding virtualized network function descriptor (VNFD) and virtual link descriptor (VLD).

The VNF package is a VNF program package, and may include the VNFD and a software image file. The VNFD has a one-to-one correspondence with the VNF, and describes a virtual resource parameter and a requirement that are needed to implement the VNF. The VNFD is mainly used by a virtualized network function manager (VNFM) to create a VNF instance and manage a lifecycle of the VNF.

Step 202: Obtain network service description information, where the network service description information is used to indicate attribute information of a virtualized network function that is included in the network service.

The network service description information may be the NSD mentioned in the foregoing, and/or information carried in the network service instantiation request sent to the primary orchestrator, that is, the network service instantiation parameter.

It should be noted that, if the NSD has been uploaded to the primary orchestrator in advance, NSD information may be directly obtained from the primary orchestrator; or if the NSD has not been uploaded to the primary orchestrator in advance, the NSD may be sent by another device or an operator to the primary orchestrator.

Step 203: Determine, according to the network service description information, some virtualized network functions that need to be deployed in a management domain of the primary orchestrator.

The network service description information may include information that describes a domain corresponding to each VNF. That is, that each VNF needs to be deployed in a management domain of which orchestrator may be determined according to the network service description information. Optionally, in this embodiment of this application, multiple VNFs included in the NS described in the network service description information need to be respectively deployed in at least two domains. Some VNFs may be deployed in a domain corresponding to the primary orchestrator, and the other VNFs may be deployed in a domain corresponding to the secondary orchestrator. Optionally, the multiple VNFs included in the NS described in the network service description information may be deployed only in the domain corresponding to the secondary orchestrator.

Step 204: Instantiate the some virtualized network functions.

The some virtualized network functions that need to be deployed in the management domain of the primary orchestrator may be directly instantiated by the primary orchestrator. For the other virtualized network functions that need to be deployed in a management domain of the secondary orchestrator, the primary orchestrator may notify the secondary orchestrator of related information, and the secondary orchestrator may deploy the other virtualized network functions. A virtualized network function deployed by the secondary orchestrator may be defined as a first virtualized network function, and a virtualized network function deployed by the primary orchestrator may be defined as a second virtualized network function.

The related information may include an ID of the primary orchestrator or an ID of the management domain of the primary orchestrator. Optionally, the related information may further include an NSD ID, a VNFD ID corresponding to a VNF that needs to be instantiated by the secondary orchestrator, an ID of an NS instance in which these VNFs are included, and another constraint related to VNF deployment. The pieces of information may be separately sent by the primary orchestrator to the secondary orchestrator, or may be carried in an instantiation request message when the primary orchestrator sends a VNF instantiation request to the secondary orchestrator.

Step 205: Determine, according to the network service description information, the other virtualized network functions that need to be deployed in a management domain of a secondary orchestrator.

Step 206: Send a VNF instantiation request to the secondary orchestrator, where the VNF instantiation request is used to request the secondary orchestrator to instantiate the other virtualized network functions.

The VNF instantiation request includes the ID of the primary orchestrator or the ID of the management domain of the primary orchestrator. Optionally, the VNF instantiation request may further include the NSD ID, the VNFD ID corresponding to the VNF that needs to be instantiated by the secondary orchestrator, an ID of an NS instance in which a VNF that needs to be instantiated by the secondary orchestrator is included, or the another constraint related to VNF deployment. The primary orchestrator and the secondary orchestrator respectively manage different domains.

To sum up, in this embodiment, network service description information is obtained; some virtualized network functions that need to be deployed in the management domain of the primary orchestrator are determined according to the network service description information; the some virtualized network functions are instantiated; the other virtualized network functions that need to be deployed in the management domain of the secondary orchestrator are determined according to the network service description information; and the VNF service instantiation request is sent to the secondary orchestrator. Therefore, cross-domain deployment of an NS can be implemented by means of information exchange between the primary orchestrator and the secondary orchestrator.

It should be noted that, in actual application, after the primary orchestrator sends the VNF instantiation request to the secondary orchestrator, the secondary orchestrator may instantiate the other virtualized network functions. After instantiating the other virtualized network functions, the secondary orchestrator may send instantiation completion notification information to the primary orchestrator. Correspondingly, the primary orchestrator may further obtain the instantiation completion notification information fed back by the secondary orchestrator, and update a network function virtualization instances catalog (NFV Instances catalogue) and a network function virtualization infrastructure resources catalog (NFVI resources catalogue) according to the instantiation completion notification information. The network function virtualization instances catalog is mainly used to record information related to an instantiated NS instance and VNF instance, and the network function virtualization infrastructure resources catalog is mainly used to record information about a virtual resource occupied by an instantiated VNF.

It should be further noted that, in actual application, when adjustment (scaling) needs to be performed on a virtual resource used by a VNF in the management domain that the secondary orchestrator is responsible for, the secondary orchestrator may apply to the primary orchestrator for scaling. After being authorized or acknowledged by the primary orchestrator, the secondary orchestrator performs scaling on the VNF. The scaling includes up-scaling and down-scaling. The up-scaling means increasing resources, and the down-scaling means reducing resources. In a process of performing scaling on the VNF in the management domain that the secondary orchestrator is responsible for, the primary orchestrator may perform the following steps obtaining, by the primary orchestrator, a scaling request sent by the secondary orchestrator, where the scaling request is used to request to perform scaling on the instantiated other virtualized network functions, determining to allow the scaling request, and sending a scaling request acknowledgment message to the secondary orchestrator.

In the foregoing steps, after obtaining the scaling request sent by the secondary orchestrator, the primary orchestrator may determine, according to a policy, whether to allow the scaling request, and send a scaling request acknowledgment message to the secondary orchestrator if the scaling request is allowed, or may send a scaling request rejection message to the secondary orchestrator if the scaling request is not allowed.

It should be further noted that, in actual application, when the secondary orchestrator needs to perform another lifecycle management operation, such as a software update and upgrade, instance termination, or instance modification, on an instantiated VNF in the management domain that the secondary orchestrator is responsible for, the secondary orchestrator needs to apply to the primary orchestrator for authorization. The secondary orchestrator may apply to the primary orchestrator each time the secondary orchestrator performs a VNF lifecycle management operation, or the primary orchestrator may send a policy to the secondary orchestrator, and the secondary orchestrator may perform a related VNF lifecycle management operation according to the policy.

Each time after performing the VNF lifecycle management operation, the secondary orchestrator needs to send a VNF lifecycle change notification to the primary orchestrator.

Figure 3A:
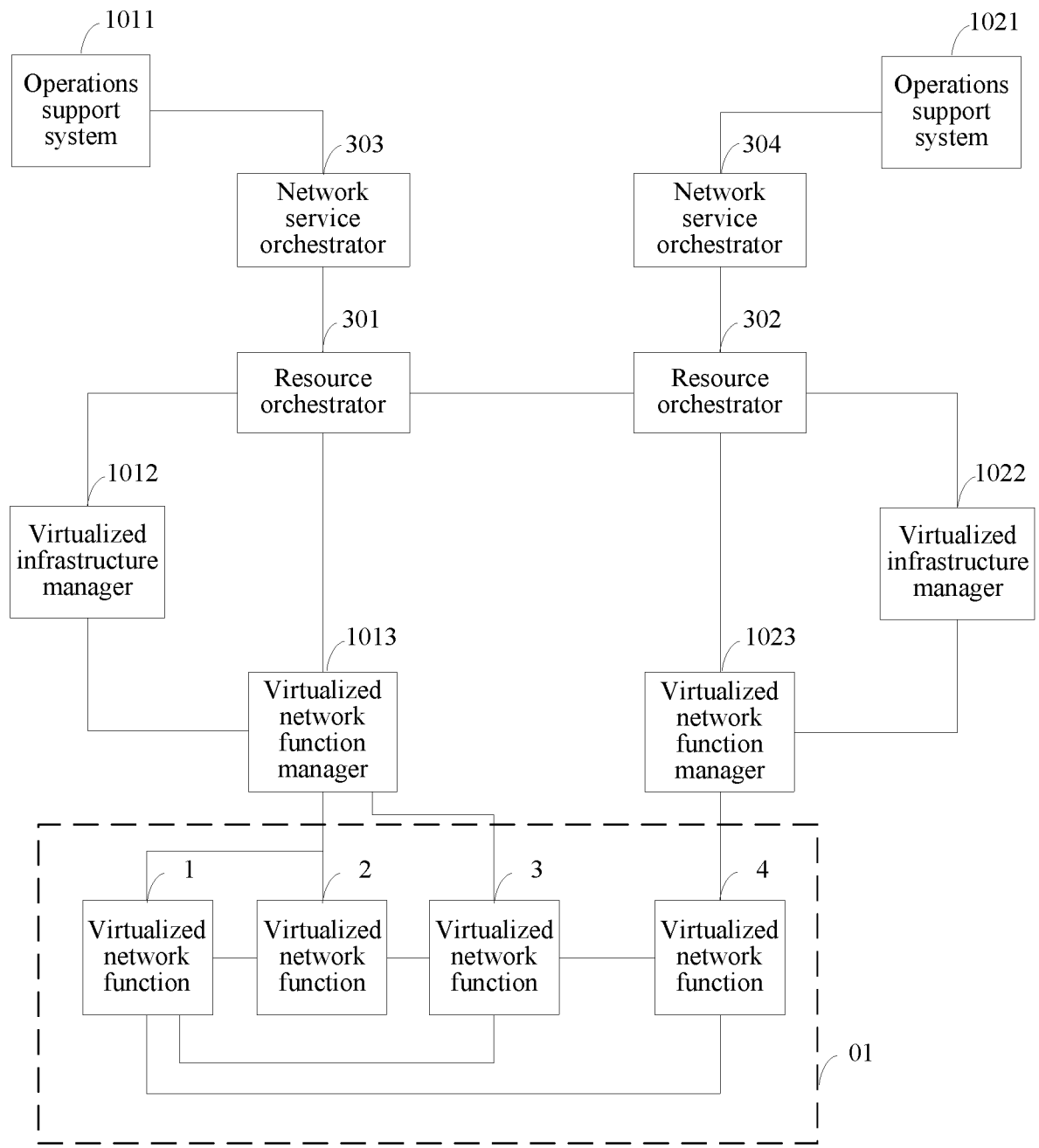
FIG. 3A is a schematic architectural diagram of another NFV system according to some embodiments.
Figure 3B:
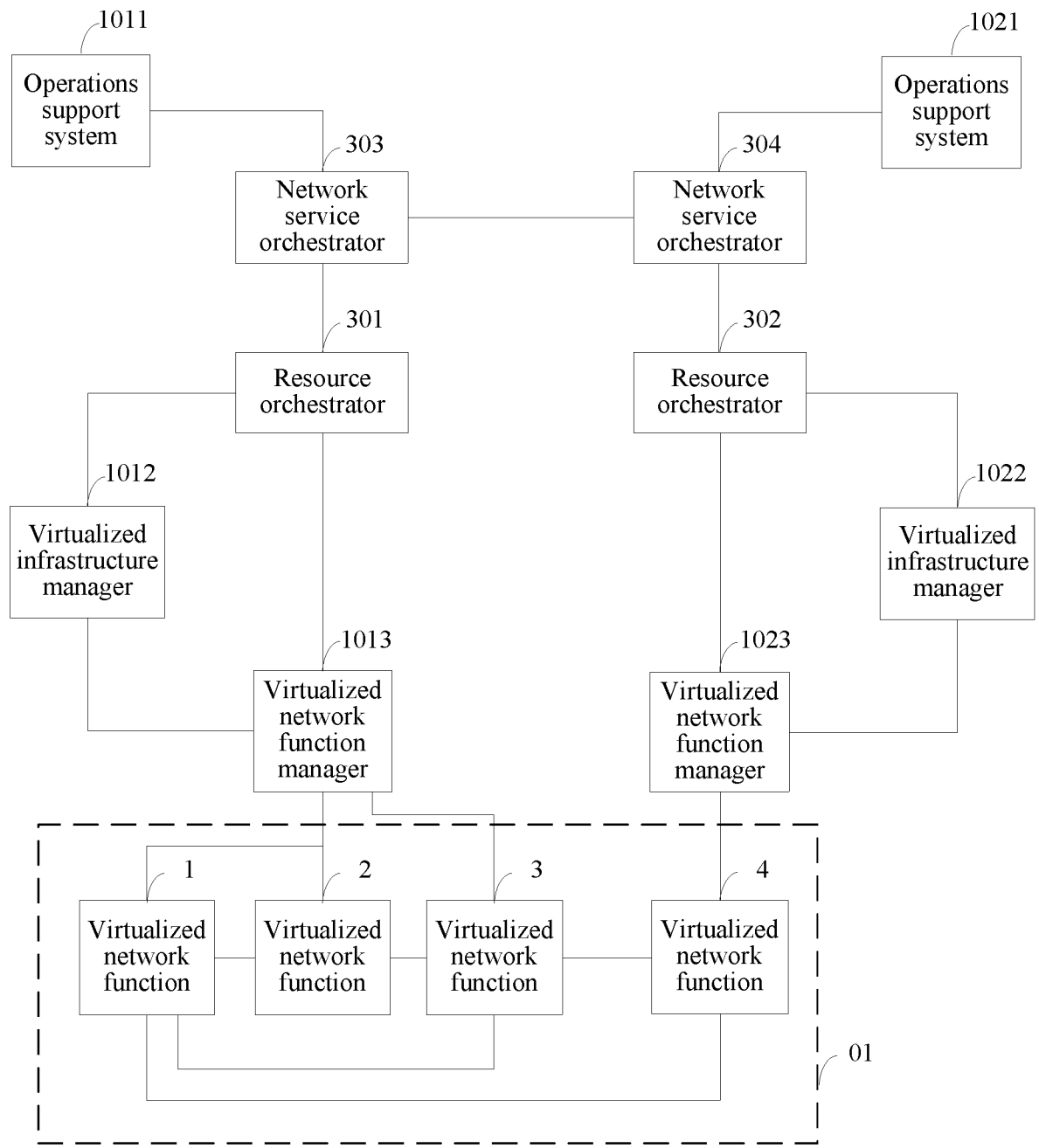
FIG. 3B is a schematic architectural diagram of still another NFV system according to some embodiments.

FIG. 3A is a schematic architectural diagram of another NFV system according to this application. FIG. 3B is a schematic architectural diagram of still another NFV system according to this application. Upon comparison, a difference distinguishing system architectures shown in FIG. 3A and FIG. 3B from a system architecture shown in FIG. 1 in that, a network function virtualization orchestrator is split into two modules: a network service orchestrator (NSO) and a resource orchestrator (RO). Specific examples in FIG. 1 and FIG. 3A are used for explanation. That is, the network function virtualization orchestrator 101 is split into a network service orchestrator 303 and a resource orchestrator 301, and the network function virtualization orchestrator 102 is split into a network service orchestrator 304 and a resource orchestrator 302.

The network service orchestrator is responsible for lifecycle management on a network service, and a resource orchestrator is responsible for virtual resource management.

In FIG. 3A, there is a communications link between the resource orchestrator 301 and the resource orchestrator 302. In FIG. 3B, there is a communications link between the network service orchestrator 303 and the network service orchestrator 304.

It should be noted that, in this application, when the primary orchestrator and the secondary orchestrator are network function virtualization orchestrators, or the primary orchestrator and the secondary orchestrator are network service orchestrators, or the primary orchestrator and the secondary orchestrator are resource orchestrators, the method for deploying a network service in the embodiments of this application may be performed or used.

Figure 4:
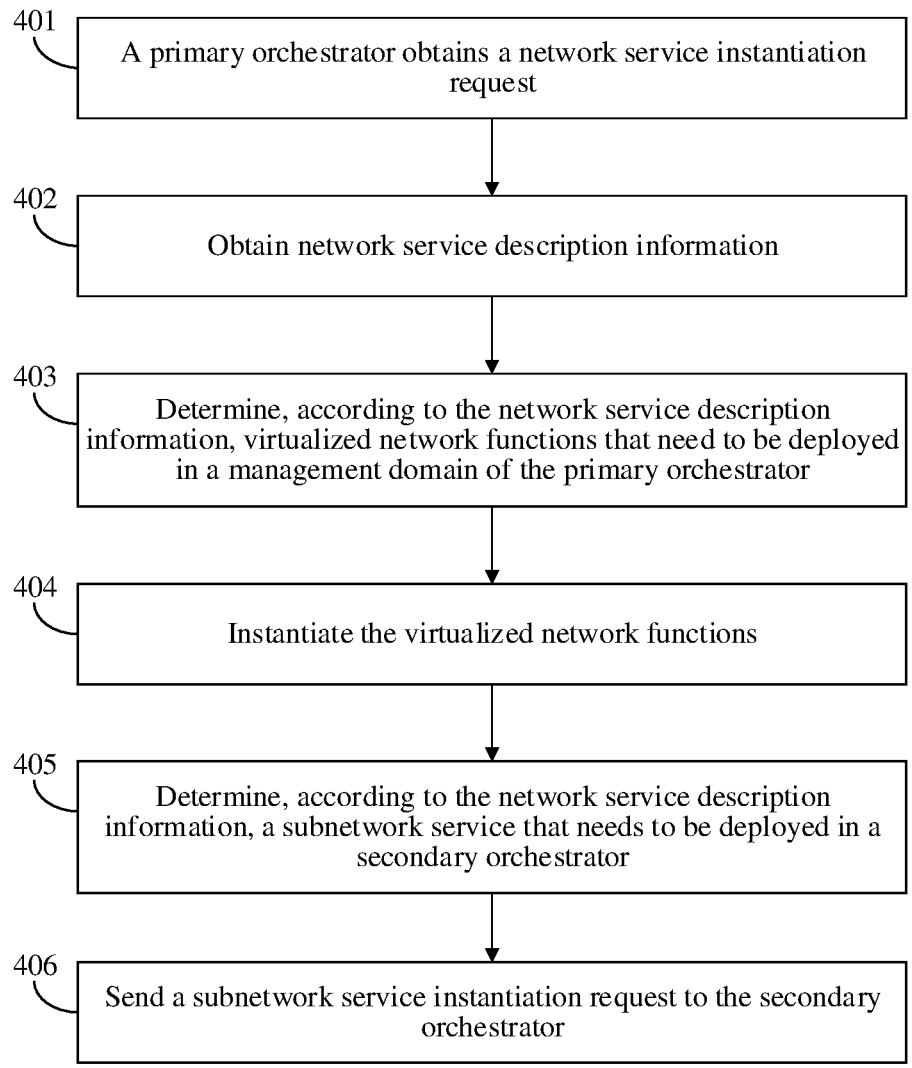
FIG. 4 is a flowchart of Embodiment 2 of a method for deploying a network service according to some embodiments.

FIG. 4 is a flowchart of Embodiment 2 of a method for deploying a network service according to this application. As shown in FIG. 4, the method may include the following steps.

Step 401: A primary orchestrator obtains a network service instantiation request, where the network service instantiation request is used to request the primary orchestrator to instantiate the network service, and the network service includes a subnetwork service nested in the network service, and one or more virtualized network functions.

Step 402: Obtain network service description information, where the network service description information is used describe attribute information of the virtualized network function and attribute information of the subnetwork service.

In this embodiment, the network service described in the network service description information is specifically a network service in which a subnetwork service is nested. The subnetwork service includes at least one virtualized network function. It is assumed that a network service NS1 includes a VNF1, a VNF2, a VNF3, and an NS2. The NS2 includes a VNF4 and a VNF5. Then, the NS2 is a subnetwork service nested in the NS1.

Step 403: Determine, according to the network service description information, the virtualized network function that needs to be deployed in a management domain of the primary orchestrator.

According to the foregoing assumption, if the VNF1, the VNF2, and the VNF3 need to be primary orchestrator deployed in the management domain of the primary orchestrator, and the NS2 needs to be deployed in a secondary orchestrator, the virtualized network function may be the VNF1, the VNF2, and the VNF3.

The network service description information may include information that describes a domain corresponding to each VNF and a domain corresponding to the subnetwork service. That is, that each VNF and the subnetwork service need to be deployed in a management domain of which orchestrator may be determined according to the network service description information. In this embodiment, the multiple VNFs and the subnetwork service included in the NS described in the network service description information need to be respectively deployed in at least two domains. The multiple VNFs may be deployed in a domain corresponding to the primary orchestrator, and the subnetwork service may be deployed in a domain corresponding to the secondary orchestrator.

Step 404: Instantiate the virtualized network functions.

Because the VNF1, the VNF2, and the VNF3 need to be primary orchestrator deployed in the management domain of the primary orchestrator, the VNF1, the VNF2, and the VNF3 may be instantiated by the primary orchestrator.

Step 405: Determine, according to the network service description information, a subnetwork service that needs to be deployed in a secondary orchestrator.

The subnetwork service may be a network service that is nested in the network service and that needs to be secondary orchestrator deployed in the management domain of the secondary orchestrator. In the foregoing assumption, the subnetwork service may be the NS2.

Step 406: Send a subnetwork service instantiation request to the secondary orchestrator, where the subnetwork service instantiation request is used to request the secondary orchestrator to instantiate the subnetwork service.

The primary orchestrator and the secondary orchestrator respectively manage different domains.

After receiving the subnetwork service instantiation request, the secondary orchestrator may determine, according to NSD information corresponding to the subnetwork service in the subnetwork service instantiation request or a network service instantiation parameter carried in the subnetwork service instantiation request, VNFs and a VL that are included in the subnetwork service, and then, instantiate each VNF and the VL according to description information about the VNFs and the VL.

The network service instantiation request includes an ID of the primary orchestrator, an ID of the management domain of the primary orchestrator, or an NSD ID of a subnetwork service that needs to be instantiated by the secondary orchestrator. Optionally, the network service instantiation request may further include an NSD ID or NS instance ID of a network service to which the subnetwork service belongs, or another constraint related to subnetwork service deployment.

To sum up, in this embodiment, the primary orchestrator obtains a network service instantiation request, obtains network service description information, determines, according to the network service description information, a virtualized network function that needs to be deployed in the management domain of the primary orchestrator, instantiates the virtualized network function, determines, according to the network service description information, a subnetwork service that needs to be deployed in the management domain of the secondary orchestrator, and sends a subnetwork service instantiation request to the secondary orchestrator. Therefore, cross-domain deployment of a network service can be implemented by means of information exchange between the primary orchestrator and the secondary orchestrator.

It should be noted that, in this embodiment, the secondary orchestrator may deploy a subnetwork service included in a network service.

It should be further noted that, in actual application, in a process of cross-domain deployment of a network service, some other technical means may be further attached, so that a process of the cross-domain deployment of the network service is consistent with an existing process of deployment of a network service. For details, see FIG. 5.

Figure 5:
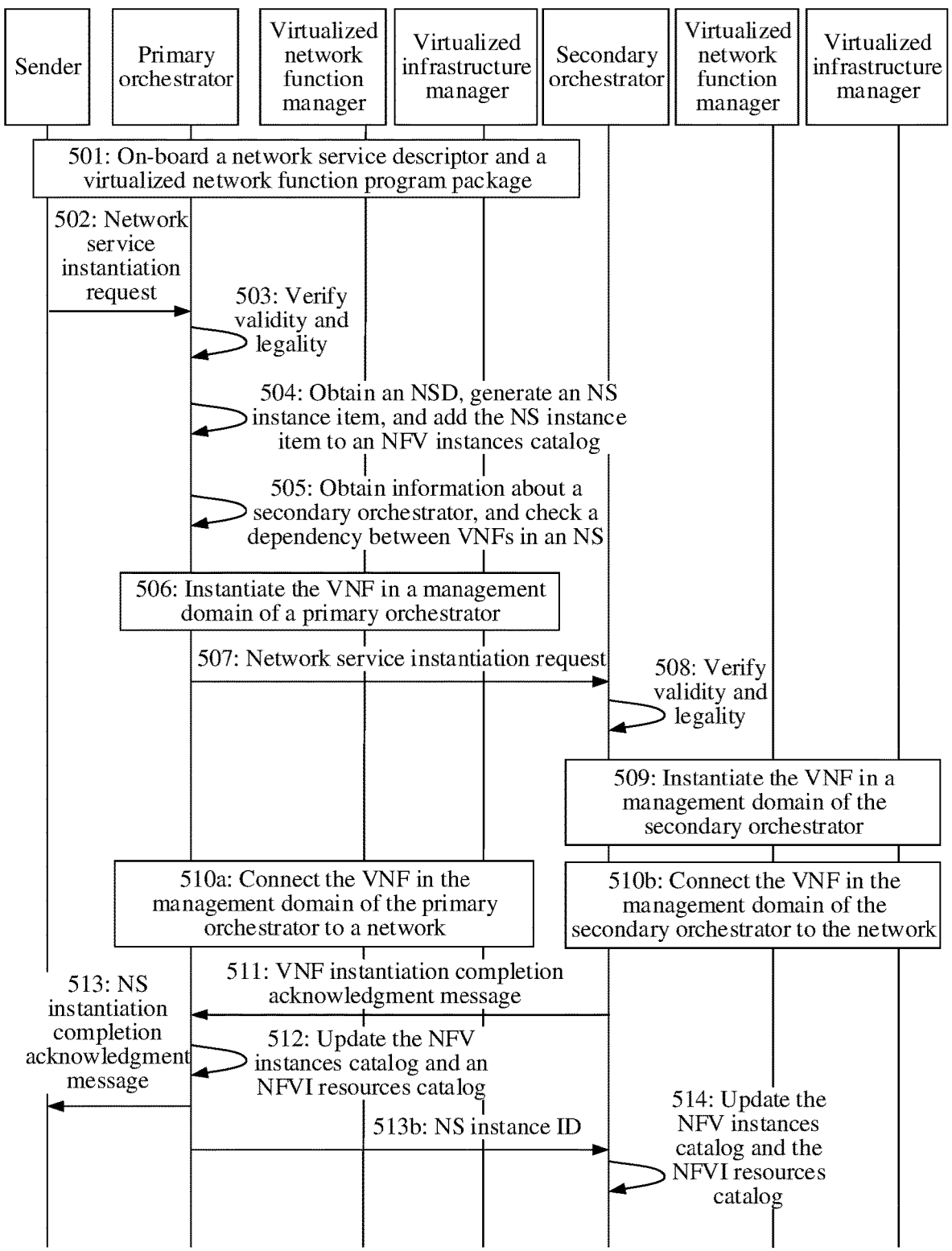
FIG. 5 is a signaling diagram of Embodiment 3 of a method for deploying a network service according to some embodiments.

FIG. 5 is a signaling diagram of Embodiment 3 of a method for deploying a network service according to this application. As shown in FIG. 5, the method may include the following steps.

Step 501: Complete on-boarding of a network service descriptor (NSD) and a virtualized network function program package (VNF package).

The NSD and the VNF package may be both on-boarded on a primary orchestrator, and both on-boarded on a secondary orchestrator. Alternatively, the NSD and the VNF package may be both on-boarded on a primary orchestrator, and only a VNF package corresponding to a VNF that needs to be deployed in a management domain of a secondary orchestrator is on-boarded on the secondary orchestrator.

Step 502: A primary orchestrator receives an NS instantiation request.

The NS instantiation request may include indication information indicating that an NS needs to be deployed across domains, and may further include role information for the NS. The role information may be used to notify the orchestrator that receives the instantiation request that the orchestrator is the primary orchestrator, and may further notify the orchestrator of information such as an identifier of the secondary orchestrator.

The role information of the NS may alternatively be described in the NSD.

Step 503: The primary orchestrator verifies validity and legality of the NS instantiation request.

The verification may be performed in an existing manner. If the NS instantiation request is valid and legal, step 504 is performed.

Step 504: The primary orchestrator obtains the NSD, generates a new NS instance item, and adds the item to an NFV instances catalog (NFV Instances catalogue).

Step 505: The primary orchestrator obtains information about a secondary orchestrator, checks a dependency between VNFs in an NS, and determines which VNFs are deployed in a management domain of the primary orchestrator and which VNFs need to be deployed with assistance from the secondary orchestrator.

Step 506: The primary orchestrator instantiates the VNFs in the management domain of the primary orchestrator.

Step 507: The primary orchestrator sends a VNF instantiation request to the secondary orchestrator.

The VNF instantiation request may include a primary orchestrator management domain ID or a primary orchestrator ID. Optionally, the VNF instantiation request may further include information such as an NSD ID, a VNFD ID, or an NS instance ID, or another constraint related to VNF deployment.

The NSD ID is used to indicate a corresponding NSD when the NS is instantiated. The VNFD ID is used to indicate a VNFD that needs to be used to instantiate the VNF. The NS instance ID is used to indicate an NS instance to which an instance of the VNF belongs. The primary orchestrator sends the foregoing information to the secondary orchestrator. The secondary orchestrator may obtain the VNFD according to the VNFD ID, and then instantiate the VNF based on the VNFD, and may further search, according to the NSD ID, for a connection relationship between the corresponding VNFD ID and the corresponding VNF, so as to perform instantiation and lifecycle management on the VNF.

Step 508: The secondary orchestrator verifies validity and legality of the VNF instantiation request sent by the primary orchestrator.

The verification may be performed in an existing manner. If the NS instantiation request is valid and legal, step 509 is performed.

Step 509: The secondary orchestrator instantiates VNFs in a management domain of the secondary orchestrator.

Step 510a: The primary orchestrator connects the VNFs in the management domain of the primary orchestrator to a network.

Step 510b: The secondary orchestrator connects the VNFs in the management domain of the secondary orchestrator to the network.

Step 511: The secondary orchestrator sends a VNF instantiation completion acknowledgment message to the primary orchestrator.

Step 512: The primary orchestrator updates the NFV instances catalog and an NFVI resources catalog of the primary orchestrator.

Step 513: The primary orchestrator sends an NS instantiation completion acknowledgment message to a sender.

Optionally, the method may further include step 513b: The primary orchestrator sends an NS instance ID to the secondary orchestrator.

Optionally, the sender may be an OSS or a business support system (BSS).

Step 514: The secondary orchestrator updates an NFV instances catalog and an NFVI resources catalog of the secondary orchestrator.

To sum up, in this embodiment, the secondary orchestrator may deploy some virtualized network functions included in a network service that needs to be deployed across domains.

Figure 6:
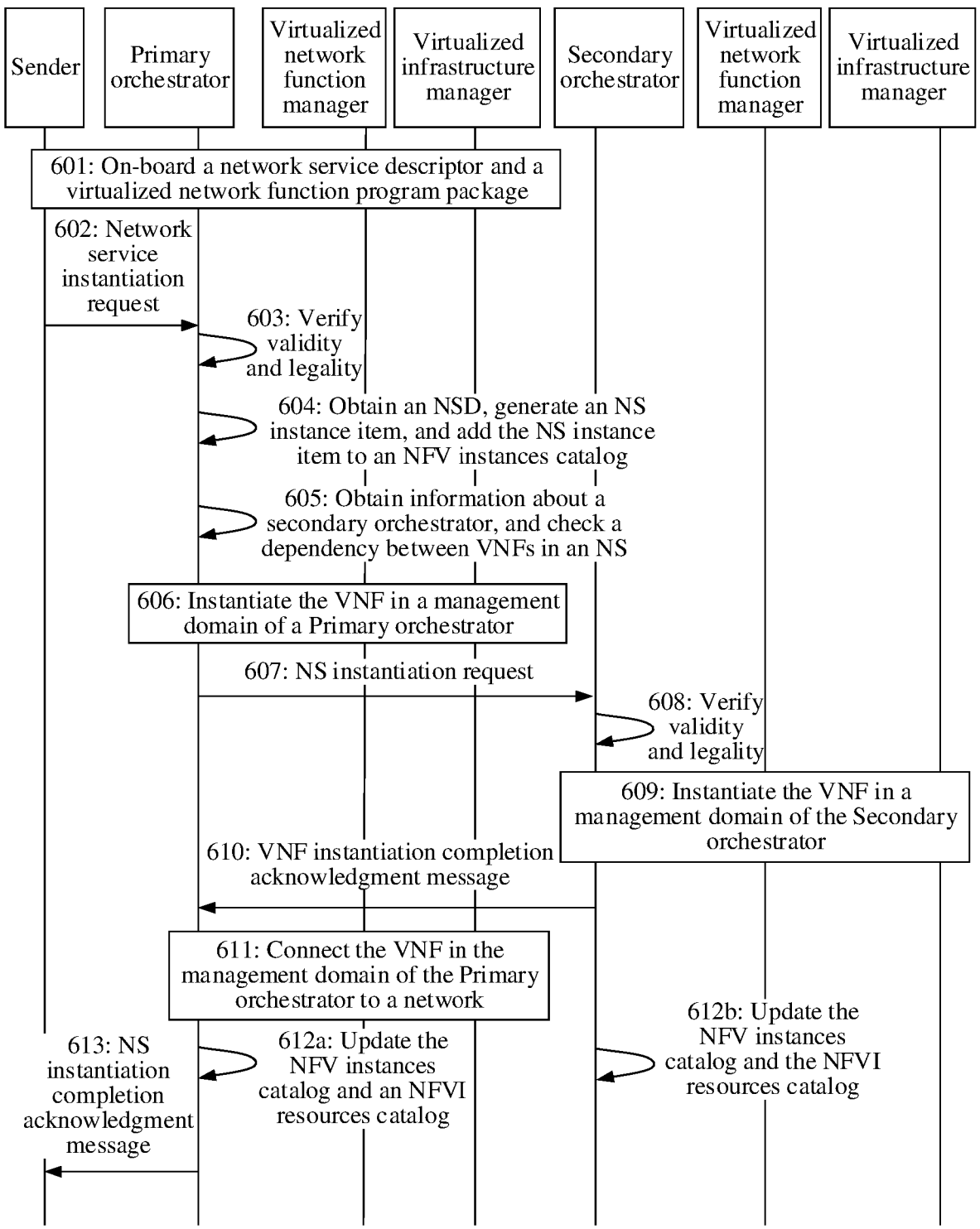
FIG. 6 is a signaling diagram of Embodiment 4 of a method for deploying a network service according to some embodiments.

FIG. 6 is a signaling diagram of Embodiment 4 of a method for deploying a network service according to this application. As shown in FIG. 6, the method may include the following steps.

Step 601: Complete on-boarding of a network service descriptor (NSD) and a virtualized network function program package (VNF package).

Step 602: A primary orchestrator receives an NS instantiation request.

The NS instantiation request may include indication information indicating that an NS needs to be deployed across domains, and may further include role information for the NS. The role information may be used to notify the orchestrator that receives the instantiation request that the orchestrator is the primary orchestrator, and may further notify the orchestrator of information such as an identifier of the secondary orchestrator.

The role information of the NS may alternatively be described in the NSD.

Step 603: The primary orchestrator verifies validity and legality of the NS instantiation request.

The verification may be performed in an existing manner. If the NS instantiation request is valid and legal, step 604 is performed.

Step 604: The primary orchestrator obtains the NSD, generates a new NS instance item, and adds the NS instance item to an NFV instances catalog (NFV Instances catalogue).

Step 605: The primary orchestrator obtains information about a secondary orchestrator, checks a dependency between VNFs in an NS, and determines which VNFs are deployed in a management domain of the primary orchestrator and which VNFs or NSs need to be deployed with assistance from the secondary orchestrator. It should be noted that, in this embodiment, a sub-NS is nested in the NS. That is, the NS includes a sub-NS that needs to be secondary orchestrator deployed in the management domain of the secondary orchestrator.

Step 606: The primary orchestrator instantiates the VNFs in the management domain of the primary orchestrator.

Step 607: The primary orchestrator sends the NS instantiation request to the secondary orchestrator.

The NS instantiation request may include a primary orchestrator management domain ID or a primary orchestrator ID, and further include an NSD ID of an NS that needs to be secondary orchestrator deployed in the management domain of the secondary orchestrator.

Step 608: The secondary orchestrator verifies validity and legality of the NS instantiation request sent by the primary orchestrator.

The verification may be performed in an existing manner. If the NS instantiation request is valid and legal, step 609 is performed.

Step 609: The secondary orchestrator instantiates an NS in a management domain of the secondary orchestrator.

Step 610: The secondary orchestrator sends an NS instantiation completion acknowledgment message to the primary orchestrator.

Step 611: The primary orchestrator connects the VNFs in the management domain of the primary orchestrator to a network.

Step 612: The primary orchestrator updates the NFV instances catalog and an NFVI resources catalog of the primary orchestrator.

Step 613: The primary orchestrator sends the NS instantiation completion acknowledgment message to a sender.

Optionally, the primary orchestrator may further send an NS instance ID to the secondary orchestrator.

It should be noted that, step 611 should be performed after step 606.

To sum up, in this embodiment, the secondary orchestrator may deploy a subnetwork service included in a network service that needs to be deployed across domains.

Figure 7:
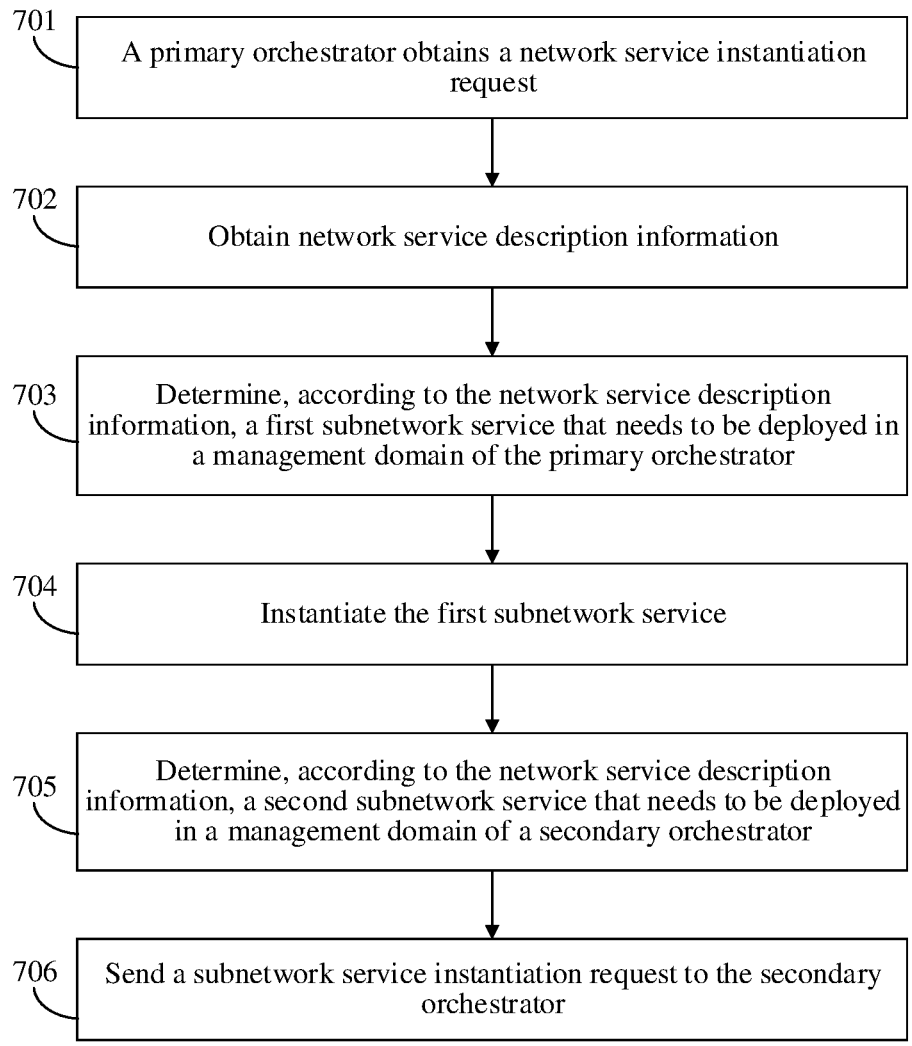
FIG. 7 is a flowchart of Embodiment 5 of a method for deploying a network service according to some embodiments.

FIG. 7 is a flowchart of Embodiment 5 of a method for deploying a network service according to this application. As shown in FIG. 7, the method may include the following steps.

Step 701: A primary orchestrator obtains a network service instantiation request, where the network service instantiation request is used to request the primary orchestrator to instantiate the network service, and the network service includes at least two subnetwork services nested in the network service.

Step 702: Obtain network service description information, where the network service description information is used to describe attribute information of the subnetwork service.

In this embodiment, the network service described in the network service description information is specifically a network service in which at least two subnetwork services are nested. The subnetwork service includes at least one virtualized network function. It is assumed that a network service NS1 includes an NS1-1 and an NS1-2. The NS1-1 includes a VNF1, a VNF2, and a VNF3, and the NS1-2 includes a VNF4 and a VNF5. The NS1-1 and the NS1-2 are subnetwork services nested in the NS1.

Step 703: Determine, according to the network service description information, a first subnetwork service that needs to be deployed in a management domain of the primary orchestrator.

According to the foregoing assumption, if the NS1-1 needs to be primary orchestrator deployed in the management domain of the primary orchestrator, and the NS2-2 needs to be secondary orchestrator deployed in the management domain of the secondary orchestrator, the first subnetwork service is the NS1-1.

The network service description information may include information that describes a domain corresponding to each subnetwork service. That is, that each subnetwork service needs to be deployed in a management domain of which orchestrator may be determined according to the network service description information. In this embodiment, the multiple subnetwork services included in the NS described in the network service description information need to be respectively deployed in at least two domains. At least one subnetwork service may be deployed in a domain corresponding to the primary orchestrator, and at least one subnetwork service may be deployed in a domain corresponding to the secondary orchestrator.

Step 704: Instantiate the first subnetwork service.

Because the subnetwork service NS1-1 needs to be primary orchestrator deployed in the management domain of the primary orchestrator, the NS1-1 may be instantiated by the primary orchestrator.

Step 705: Determine, according to the network service description information, a second subnetwork service that needs to be deployed in a management domain of the secondary orchestrator.

The second subnetwork service may be a subnetwork service that is nested in the network service and that needs to be secondary orchestrator deployed in the management domain of the secondary orchestrator. In the foregoing assumption, the subnetwork service may be the NS1-2.

Step 706: Send a subnetwork service instantiation request to the secondary orchestrator, where the subnetwork service instantiation request is used to request the secondary orchestrator to instantiate the second subnetwork service.

The primary orchestrator and the secondary orchestrator respectively manage different domains.

After receiving the subnetwork service instantiation request, the secondary orchestrator may determine, according to NSD information corresponding to the subnetwork service in the subnetwork service instantiation request or a network service instantiation parameter carried in the subnetwork service instantiation request, VNFs and a VL that are included in the subnetwork service, and then, instantiate each VNF and the VL according to description information about the VNFs and the VL.

The network service instantiation request includes an ID of the primary orchestrator, an ID of the management domain of the primary orchestrator, or an NSD ID of a subnetwork service that needs to be instantiated by the secondary orchestrator. Optionally, the network service instantiation request may further include an NSD ID or NS instance ID of a network service to which the subnetwork service belongs, or another constraint related to subnetwork service deployment.

To sum up, in this embodiment, the primary orchestrator obtains network service instantiation request, obtains network service description information, determines, according to the network service description information, a first subnetwork service that needs to be deployed in the management domain of the primary orchestrator, instantiates the first subnetwork service, determines, according to the network service description information, a second subnetwork service that needs to be deployed in the management domain of the secondary orchestrator, and sends a subnetwork service instantiation request to the secondary orchestrator. Therefore, cross-domain deployment of a network service can be implemented by means of information exchange between the primary orchestrator and the secondary orchestrator.

It should be noted that, in this embodiment, the secondary orchestrator may deploy a subnetwork service included in a network service.

This application further provides another method for deploying a network service which may be performed by the secondary orchestrator.

Figure 8:
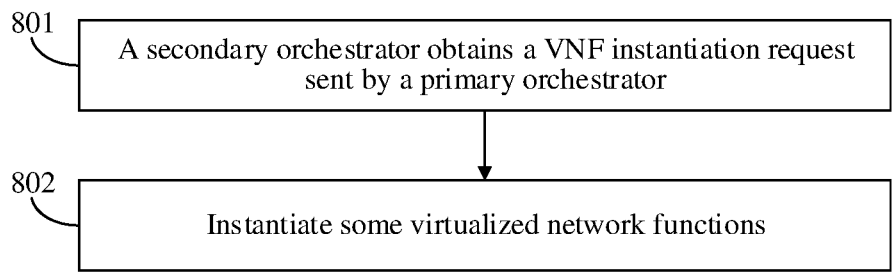
FIG. 8 is a flowchart of Embodiment 6 of a method for deploying a network service according to some embodiments.

FIG. 8 is a flowchart of Embodiment 6 of a method for deploying a network service according to this application. As shown in FIG. 8, the method may include the following steps.

Step 801: A secondary orchestrator obtains a VNF instantiation request sent by a primary orchestrator, where the VNF instantiation request is used to request the secondary orchestrator to instantiate some virtualized network functions in the network service.

The request for instantiating some network services may include a primary orchestrator management domain ID or a primary orchestrator ID. Optionally, the request may further include an NSD ID, a VNFD ID corresponding to a VNF that needs to be instantiated by the secondary orchestrator, an ID of an NS instance in which a VNF that needs to be instantiated by the secondary orchestrator is included, or another constraint related to VNF deployment.

Step 802: Instantiate the some virtualized network functions.

The primary orchestrator and the secondary orchestrator respectively belong to different domains.

In this embodiment, a VNF instantiation request sent by the primary orchestrator is obtained, and the some virtualized network functions are instantiated. Therefore, the secondary orchestrator may be used as a body to implement cross-domain deployment of an NS by means of information exchange between the primary orchestrator and the secondary orchestrator.

In actual application, after the instantiating the some virtualized network functions, the method may further include: sending instantiation completion notification information to the primary orchestrator.

In actual application, after the instantiating the some virtualized network functions, the method may further include sending a lifecycle management operation request to the primary orchestrator, where the lifecycle management operation request is used to request to manage a lifecycle of one or more virtualized network functions in the instantiated some virtualized network functions, obtaining a lifecycle management operation request acknowledgment message fed back by the primary orchestrator, and performing a lifecycle management operation on the one or more virtualized network functions in the instantiated some virtualized network functions.

In actual application, when the secondary orchestrator needs to perform another lifecycle management operation, such as a software update and upgrade, instance termination, or instance modification, on an instantiated VNF in the management domain that the secondary orchestrator is responsible for, the secondary orchestrator needs to apply to the primary orchestrator for authorization. The secondary orchestrator may apply to the primary orchestrator each time the orchestrator performs the VNF lifecycle management operation, or the primary orchestrator may send a policy to the secondary orchestrator, and the secondary orchestrator may perform a related VNF lifecycle management operation according to the policy.

Each time after performing the VNF lifecycle management operation, the secondary orchestrator may send a VNF lifecycle change notification to the primary orchestrator.

Figure 9:
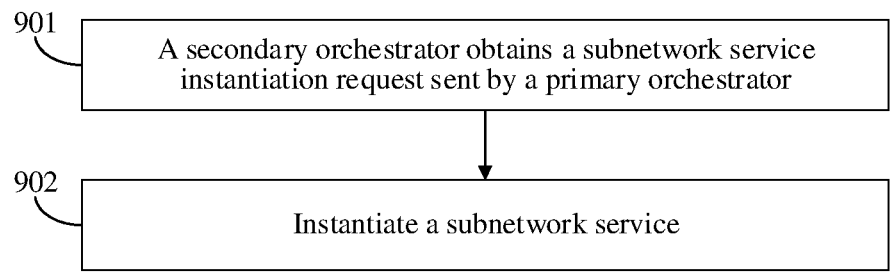
FIG. 9 is a flowchart of Embodiment 7 of a method for deploying a network service according to some embodiments.

FIG. 9 is a flowchart of Embodiment 7 of a method for deploying a network service according to this application. As shown in FIG. 9, the method may include the following steps:

Step 901: A secondary orchestrator obtains a subnetwork service instantiation request sent by a primary orchestrator, where the subnetwork service instantiation request is used to request the secondary orchestrator to instantiate a subnetwork service in the network service, and the network service includes the subnetwork service nested in the network service, and one or more virtualized network functions.

Step 902: Instantiate the subnetwork service.

The primary orchestrator and the secondary orchestrator respectively belong to different domains.

In this embodiment, a subnetwork service instantiation request sent by the primary orchestrator is obtained, and the subnetwork service is instantiated. Therefore, the secondary orchestrator may be used as a body to implement cross-domain deployment of an NS by means of information exchange between the primary orchestrator and the secondary orchestrator.

In actual application, after the instantiating the subnetwork service, the method may further include: sending instantiation completion notification information to the primary orchestrator.

In actual application, after the instantiating the subnetwork service, the method may further include sending a network service management request to the primary orchestrator, where the network service management request is used to request to manage the instantiated subnetwork service, obtaining a network service management request acknowledgment message fed back by the primary orchestrator, and managing the instantiated subnetwork service.

In actual application, when the secondary orchestrator needs to perform a lifecycle management operation, such as NS/VNF scaling, an NS/VNF update, NS/VNF instance termination, or NS/VNF instance modification, on an instantiated subnetwork service in the management domain that the secondary orchestrator is responsible for or a VNF included in a subnetwork service, the secondary orchestrator needs to apply to the primary orchestrator for authorization. The secondary orchestrator may apply to the primary orchestrator each time the secondary orchestrator performs an NS/VNF lifecycle management operation, or the primary orchestrator may send a policy to the secondary orchestrator, and the secondary orchestrator may perform a related NS/VNF lifecycle management operation according to the policy.

Each time after performing the NS/VNF lifecycle management operation, the secondary orchestrator may send an NS/VNF lifecycle change notification to the primary orchestrator.

In addition, the embodiments of this application further provide an apparatus for deploying a network service. This apparatus may be a host server that has a calculation capability, a personal computer PC, a portable computer or terminal that may be carried, or the like. The specific embodiments of this application do not limit specific implementation of a computing node.

Figure 10:
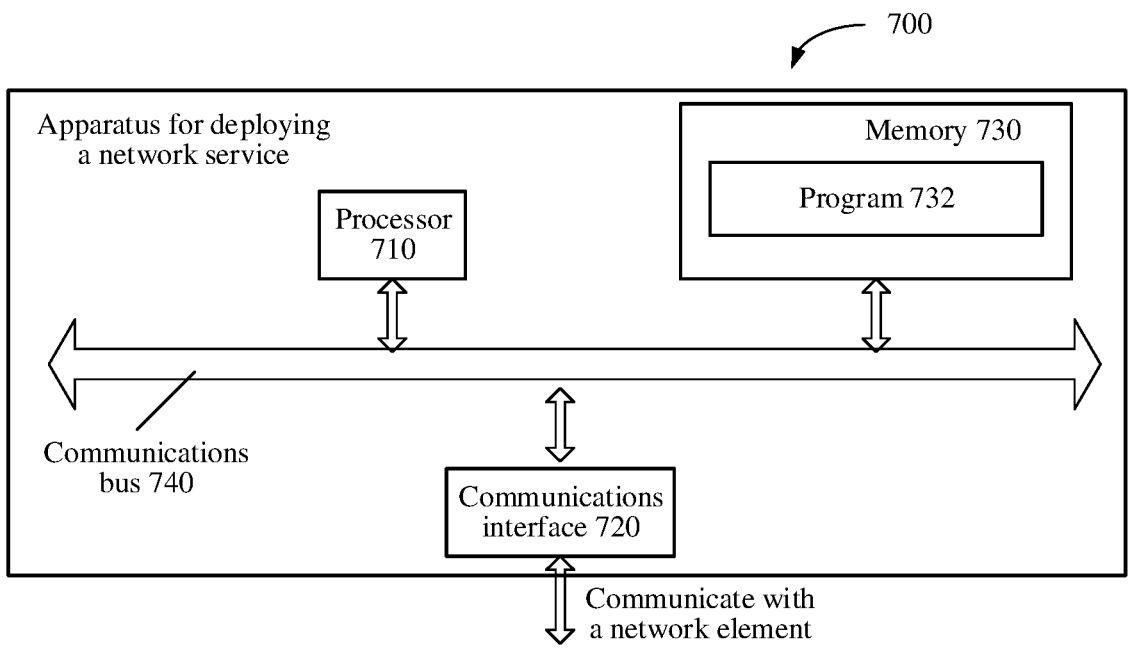
FIG. 10 is a structural diagram of an apparatus for deploying a network service according to some embodiments.

FIG. 10 is a structural diagram of an apparatus for deploying a network service according to this application. As shown in FIG. 10, the apparatus 700 includes a processor 710, a communications interface 720, a memory 730, and a bus 740.

The processor 710, the communications interface 720, and the memory 730 communicate with each other by using the bus 740.

The processor 710 is configured to execute a program 732.

Specifically, the program 732 may include program code, and the program code includes a computer operation instruction.

The processor 710 may be a central processing unit CPU, or an application-specific integrated circuit ASIC, or one or more integrated circuits configured to implement the embodiments of this application.

The memory 730 is configured to store a program 732. The memory 730 may include a high-speed RAM memory, and may further include a non-volatile memory such as at least one magnetic disk memory. An instruction stored in memory 730 may enable the processor 710 to perform the method in method embodiments 1 to 7.

Optionally, the apparatus for deploying a network service may be a primary orchestrator. The instruction stored in the memory 730 may enable the processor 710 to perform the following operations: obtaining a network service instantiation request, where the network service instantiation request is used to request the apparatus for deploying a network service to instantiate the network service, obtaining network service description information across orchestrator management domains, determining, according to the network service description information, a first virtualized network function that needs to be deployed in a management domain of a secondary orchestrator, and sending a virtualized network function instantiation request to the secondary orchestrator by using the communications interface, where the virtualized network function instantiation request is used to request the secondary orchestrator to instantiate the first virtualized network function.

A management domain of the apparatus for deploying a network service is different from the management domain of the secondary orchestrator. Alternatively, the instruction stored in the memory 730 may enable the processor 710 to perform the following operations, including obtaining a network service instantiation request, where the network service instantiation request is used to request the apparatus for deploying a network service to instantiate the network service, and the network service includes a first subnetwork service nested in the network service, obtaining network service description information across orchestrator management domains, determining, according to the network service description information, the first subnetwork service that needs to be deployed in a management domain of a secondary orchestrator, and sending a subnetwork service instantiation request to the secondary orchestrator by using the communications interface, where the subnetwork service instantiation request is used to request the secondary orchestrator to instantiate the first subnetwork service, where a management domain of the apparatus for deploying a network service is different from the management domain of the secondary orchestrator.

Optionally, the apparatus for deploying a network service may be a secondary orchestrator. The instruction stored in the memory 730 may enable the processor 710 to perform the following operations receiving, by using the communications interface, a virtualized network function instantiation request sent by a primary orchestrator, where the virtualized network function instantiation request is used to request the apparatus for deploying a network service to instantiate a virtualized network function that is in the network service and that needs to be deployed in a management domain of the apparatus for deploying a network service, and instantiating the virtualized network function that needs to be deployed in the management domain of the apparatus for deploying a network service, where the management domain of the apparatus for deploying a network service is different from a management domain of the primary orchestrator.

Alternatively, the instruction stored in the memory 730 may enable the processor 710 to perform the following operations receiving, by using the communications interface, a subnetwork service instantiation request sent by a primary orchestrator, where the subnetwork service instantiation request is used to request the apparatus for deploying a network service to instantiate a subnetwork service in the network service, and instantiating the subnetwork service, where a management domain of the primary orchestrator is different from a management domain of the apparatus for deploying a network service.

The embodiments in this specification are all described in a progressive manner, for same or similar parts in the embodiments, reference may be made to these embodiments, and each embodiment focuses on a difference from other embodiments. The apparatus disclosed in the embodiments is described relatively briefly because it corresponds to the method disclosed in the embodiments, and for portions related to those of the method, reference may be made to the description of the method.

A person skilled in the art may further be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or software and hardware depends on particular applications and design constraint conditions of the technical solutions. A person skilled in the art may use different methods to implement the described functions for each particular application, but it should not be considered that the implementation goes beyond the scope of the present disclosure.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the scope of the present disclosure. Therefore, the present disclosure will not be limited to the embodiments described in this specification but extends to the widest scope that complies with the principles and novelty disclosed in this specification.

What is claimed is:

1. A method for deploying a network service, comprising:

obtaining, by a primary orchestrator, a network service instantiation request, wherein the network service instantiation request requests that the primary orchestrator instantiate the network service, and wherein the network service comprises a first subnetwork service nested in the network service;

obtaining, by the primary orchestrator, network service description information across orchestrator management domains;

determining, by the primary orchestrator and according to the network service description information, that the first subnetwork service needs to be deployed in a management domain of a secondary orchestrator;

sending, by the primary orchestrator, a subnetwork service instantiation request to the secondary orchestrator, wherein the subnetwork service instantiation request requests that the secondary orchestrator instantiate the first subnetwork service;

determining, by the primary orchestrator according to the network service description information, a virtualized network function that needs to be deployed in a management domain of the primary orchestrator, wherein the network service further comprises the virtualized network function; and instantiating, by the primary orchestrator, the virtualized network function;

wherein the management domain of the primary orchestrator is different from the management domain of the secondary orchestrator.

2. The method according to claim 1, wherein the method further comprises performing, after the sending the subnetwork service instantiation request to the secondary orchestrator:

receiving, by the primary orchestrator, a lifecycle management operation request sent by the secondary orchestrator, wherein the lifecycle management operation request requests to manage a lifecycle of the instantiated first subnetwork service; and sending, by the primary orchestrator, a lifecycle management operation request acknowledgment message to the secondary orchestrator.

3. The method according to claim 1, wherein the method further comprises performing, after the sending the subnetwork service instantiation request to the secondary orchestrator:

sending, by the primary orchestrator, lifecycle management policy information to the secondary orchestrator, wherein the lifecycle management policy information is for describing permission of the secondary orchestrator to perform a lifecycle management operation on the first subnetwork service.

4. The method according to claim 1, wherein the network service description information comprises at least one of a network service descriptor or a network service instantiation parameter.

5. An apparatus, comprising:
at least one processor; and
a non-transitory computer readable storage medium storing a program for execution by the at least one processor, the program comprising instructions for:

obtaining a network service instantiation request, wherein the network service instantiation request requests that a primary orchestrator instantiate a network service, and wherein the network service comprises a first subnetwork service nested in the network service;

obtaining network service description information across orchestrator management domains;

determining, according to the network service description information, that the first subnetwork service needs to be deployed in a management domain of a secondary orchestrator;

sending a subnetwork service instantiation request to the secondary orchestrator, wherein the subnetwork service instantiation request requests that the secondary orchestrator instantiate the first subnetwork service;

determining, according to the network service description information, a virtualized network function that needs to be deployed in a management domain of the primary orchestrator, wherein the network service further comprises the virtualized network function; and instantiating the virtualized network function;

wherein the management domain of the primary orchestrator is different from the management domain of the secondary orchestrator.

6. The apparatus according to claim 5, wherein the program further comprises instructions for, after the sending the subnetwork service instantiation request to the secondary orchestrator:

receiving a lifecycle management operation request sent from the secondary orchestrator, wherein the lifecycle management operation request is for requesting to manage a lifecycle of the instantiated first subnetwork service; and sending a lifecycle management operation request acknowledgment message to the secondary orchestrator.

7. The apparatus according to claim 5, wherein the program further comprises instructions for, after the sending the subnetwork service instantiation request to the secondary orchestrator:

sending lifecycle management policy information to the secondary orchestrator, wherein the lifecycle management policy information describes permission of the secondary orchestrator to perform a lifecycle management operation on the first subnetwork service.

8. The apparatus according to claim 5, wherein the network service description information comprises at least one of a network service descriptor or a network service instantiation parameter.

9. The method according to claim 1, wherein the primary orchestrator is a primary network function virtualization orchestrator (NFVO) and the secondary orchestrator is a secondary (NFVO).

10. The apparatus according to claim 5, wherein the primary orchestrator is a primary network function virtualization orchestrator (NFVO) and the secondary orchestrator is a secondary (NFVO).

11. A system, comprising:
a primary orchestrator; and
a secondary orchestrator, wherein a management domain of the primary orchestrator is different from a management domain of the secondary orchestrator;

wherein the primary orchestrator comprises:
at least one processor; and
a non-transitory computer readable storage medium storing a program for execution by the at least one processor, the program comprising instructions for:

obtaining a network service instantiation request, wherein the network service instantiation request requests that the primary orchestrator instantiate a network service, and wherein the network service comprises a first subnetwork service nested in the network service;

obtaining network service description information across orchestrator management domains;

determining, according to the network service description information, that the first subnetwork service needs to be deployed in the management domain of the secondary orchestrator;

sending a subnetwork service instantiation request to the secondary orchestrator, wherein the subnetwork service instantiation request requests that the secondary orchestrator instantiate the first subnetwork service;

determining, according to the network service description information, a virtualized network function that needs to be deployed in the management domain of the primary orchestrator, wherein the network service further comprises the virtualized network function; and instantiating the virtualized network function.

12. The system according to claim 11, wherein the program further comprises instructions for, after the sending the subnetwork service instantiation request to the secondary orchestrator:

receiving a lifecycle management operation request sent from the secondary orchestrator, wherein the lifecycle management operation request is for requesting to manage a lifecycle of the instantiated first subnetwork service; and sending a lifecycle management operation request acknowledgment message to the secondary orchestrator.

13. The system according to claim 11, wherein the program further comprises instructions for, after the sending the subnetwork service instantiation request to the secondary orchestrator:

sending lifecycle management policy information to the secondary orchestrator, wherein the lifecycle management policy information describes permission of the secondary orchestrator to perform a lifecycle management operation on the first subnetwork service.

14. The system according to claim 11, wherein the network service description information comprises at least one of a network service descriptor or a network service instantiation parameter.

15. The system according to claim 11, wherein the primary orchestrator is a primary network function virtualization orchestrator (NFVO) and the secondary orchestrator is a secondary NFVO.

16. A method for deploying a network service, comprising:

obtaining, by a primary orchestrator, a network service instantiation request, wherein the network service instantiation request requests that the primary orchestrator instantiate the network service, the network service comprises a first subnetwork service nested in the network service;

obtaining, by the primary orchestrator, network service description information across orchestrator management domains;

determining, by the primary orchestrator and according to the network service description information, that the first subnetwork service needs to be deployed in a management domain of a secondary orchestrator;

sending, by the primary orchestrator, a subnetwork service instantiation request to the secondary orchestrator, wherein the subnetwork service instantiation request requests that the secondary orchestrator instantiate the first subnetwork service;

instantiating, by the secondary orchestrator, the first subnetwork service;

determining, by the primary orchestrator according to the network service description information, a virtualized network function that needs to be deployed in a management domain of the primary orchestrator, wherein the network service further comprises the virtualized network function; and instantiating, by the primary orchestrator, the virtualized network function;

wherein the management domain of the primary orchestrator is different from the management domain of the secondary orchestrator.

17. The method according to claim 16, wherein the network service further comprises a second subnetwork service, and wherein the method further comprises:

determining, by the primary orchestrator according to the network service description information, the second subnetwork service that needs to be deployed in the management domain of the primary orchestrator; and instantiating, by the primary orchestrator, the second subnetwork service.

18. The method according to claim 16, wherein the method further comprises performing, after the sending the subnetwork service instantiation request to the secondary orchestrator:

receiving, by the primary orchestrator, a lifecycle management operation request sent by the secondary orchestrator, wherein the lifecycle management operation request requests to manage a lifecycle of the instantiated first subnetwork service; and sending, by the primary orchestrator, a lifecycle management operation request acknowledgment message to the secondary orchestrator.

19. The method according to claim 16, wherein the method further comprises performing, after the sending the subnetwork service instantiation request to the secondary orchestrator:

sending, by the primary orchestrator, lifecycle management policy information to the secondary orchestrator, wherein the lifecycle management policy information is for describing permission of the secondary orchestrator to perform a lifecycle management operation on the first subnetwork service.

20. A non-transitory computer-readable storage medium storing a program to be executed by at least one processor, the program including instructions to configure the at least one processor for:

obtaining a network service instantiation request, wherein the network service instantiation request requests that a primary orchestrator instantiate a network service, and the network service comprises a first subnetwork service nested in the network service;

obtaining network service description information across orchestrator management domains;

determining, according to the network service description information, that the first subnetwork service needs to be deployed in the management domain of a secondary orchestrator;

sending a subnetwork service instantiation request to the secondary orchestrator, wherein the subnetwork service instantiation request requests that the secondary orchestrator instantiate the first subnetwork service;

determining, according to the network service description information, a virtualized network function that needs to be deployed in the management domain of the primary orchestrator, wherein the network service further comprises the virtualized network function; and instantiating the virtualized network function;

wherein the management domain of the primary orchestrator is different from the management domain of the secondary orchestrator.

\* \* \* \* \*